United States Patent Office 3,548,030
Patented Dec. 15, 1970

3,548,030
VINYL ESTER RESINS CONTAINING ESTERIFIED SECONDARY HYDROXY GROUPS
Jack W. Jernigan, Lake Jackson, Tex., assignor to The Dow Chemical Company, Midland, Mich., a corporation of Delaware
No Drawing. Filed Mar. 27, 1968, Ser. No. 716,311
Int. Cl. C08g 45/04
U.S. Cl. 260—836        10 Claims

ABSTRACT OF THE DISCLOSURE

A fast curing B-staged vinyl ester resin having a stable shelf life is prepared incorporating, as a catalyst, 2,5-dimethylhexane-2,5 diperoctoate or a mixture of the peroctoate with dicumyl peroxide. The vinyl ester resin contains up to 70 percent by weight of a monomer polymerizable therewith and is chemically modified to contain free carboxylic acid groups. The B-staging is accomplished by added controlled amounts of a Group II metal oxide or hydroxide and water.

BACKGROUND OF THE INVENTION

This invention relates to thickened or B-staged vinyl ester resin compositions containing specific peroxide catalysts which provide extended shelf life for the compositions yet also provide fast cure rates.

Vinyl ester resins which have been chemically modified to contain free carboxylic acid groups can be readily thickened or B-staged by combining with said resin a Group II metal oxide or hydroxide, particularly magnesium oxide, and controlled amounts of water. The thickening action can be very rapid—as little time as a few minutes or even less—and is generally accelerated by heating to moderate temperatures. The thickened or B-staged resin, frequently, is dry to the touch, non-tacky and has thermoplastic characteristics.

The B-staged vinyl ester resins are of particular value to the automatic molding of reinforced plastics in that a moldable glass fiber reinforced resinous mat can be readily prepared using said resin. Generally, the resin is formulated with a catalyst, a polymerizable monomer such as styrene, an inert filler or extender, pigments, mold release agents, etc. as well as the B-staging reactants. The finished mat is readily handled and can be automatically moved, cut and the pieces fed to an automatically operated molding machine.

Preferably a B-staged mat should cure rapidly in the mold if full advantage is to be taken of automation. However, catalysts which normally provide fast cure rates have poor shelf life, and those catalysts which provide extended shelf life normally have a slow cure rate.

SUMMARY OF THE INVENTION

This invention is directed to a B-staged chemically modified vinyl ester resin, containing 2,5-dimethylhexane-2,5-diperoctoate or said diperoctoate combined with dicumyl peroxide as catalyst, which has both an extended shelf life and a fast cure rate. Additionally, the invention relates to vinyl ester resins chemically modified to contain free carboxylic acid groups and to the B-staging of the resin by the use of a Group II metal oxide or hydroxide, particularly magnesium oxide, and controlled amounts of water.

DETAILED DESCRIPTION

The chemically modified vinyl ester resins of this invention are generally prepared by reacting an ethylenically unsaturated monocarboxylic acid with a polyepoxide resin followed by a post reaction of a cyclic dicarboxylic acid anhydride with the secondary hydroxyl group formed from the interaction of the polyepoxide with the unsaturated carboxylic acid. In this manner a controlled amount of free carboxylic acid groups are readily introduced into the vinyl ester resin. The final resin may be used, as is, but is generally diluted with a polymerizable monomer such as styrene. The above resins are fully described in the application of David H. Swisher and David C. Garms. Ser. No. 597,233, filed on Nov. 28, 1966 and are incorporated herein by reference.

According to the above procedures a chemically modified vinyl ester resin may be prepared, for example, by first reacting an unsaturated monocarboxylic acid such as a maleate half ester, prepared by reacting one mole of maleic anhydride with one mole of hydroxyethyl acrylate, with a polyepoxide resin prepared from bisphenol A. Post modification of the secondary hydroxyl groups resulting from the interaction of the epoxide with said maleate half ester may then be carried out by reaction with an anhydride, such as phthalic anhydride (varying ratios of anhydride/hydroxide), to produce free carboxylic acid groups. The final resin is usually diluted with a polymerizable monomer such as styrene, alkyl acrylates or methacrylates, and the like, up to as much as 70 percent by weight, if desired.

The presence of the free carboxylic acid groups provide reactive sites which can be utilized to rapidly thicken or B-stage the resin. The addition of a Group II metal oxide or hydroxide, particularly magnesium oxide and water in controlled amounts can B-stage the chemically modified vinyl ester resin in a few minutes or even less or can be controlled to B-stage more slowly if desired.

B-staging is fully described in the application of Jack W. Jernigan, Ser. No. 601,860, filed on Dec. 15, 1966 and now U.S. 3,466,259 and is incorporated herein by reference. Further description of the B-staging process and product is found in a paper by J. W. Jernigan, C. R. Bearden and D. W. Pennington, entitled High Speed B-Staging With Vinyl Ester Resins—a Route to the Automation of Reinforced Plastics Molding and presented at the Society of the Plastics Industry meeting in February 1967, and is also incorporated herein by reference.

Generally, the chemically modified vinyl ester resin (usually diluted with a polymerizable monomer) and catalyst are blended together before any inert filler such as clay is admixed. Additionally, other additives such as lubricants, mold release agents, etc. are mixed in before the B-staging agents of magnesium oxide and water, if not already present, are added. The magnesium oxide may be in a powder form or prepared as a fluid dispersion. The resin formulation may be used, as is, or it may also be mixed with reinforcing materials such as asbestos, chopped glass fibers, a glass fiber mat and the like. When no storage of more than a few days is contemplated, the B-staged resin is formulated to contain a fast cure initiator such as benzoyl peroxide. When extended storage is necessary the B-staged resin is formulated to contain a high temperature initiator such as dicumyl peroxide even though a slower cure rate is obtained.

In the first stage of the resin preparation, the polyepoxide is added in an amount sufficient to provide about 0.8 to 1.2 equivalents of epoxide per equivalent of carboxylic acid. The reaction is completed by the addition of a dicarboxylic acid anhydride to form pendant half ester groups with the secondary alcohol group generated from the epoxide-carboxylic acid reaction. The proportion of this added dicarboxylic acid anhydride can be varied to convert from 10 percent to 100 percent of the secondary hydroxyl groups to pendant half ester groups by reacting about 0.1 to 1.2 moles of dicarboxylic acid anhydride per equivalent of epoxide.

Ethylenically unsaturated carboxylic acids suitable for reaction with the polyepoxied include the α,β-unsaturated monocarboxylic acids and the hydroxyalkyl acrylate or methacrylate half esters of dicarboxylic acids. The α,β-unsaturated monocarboxylic acids include acrylic acid, methacrylic acid, crotonic acid, cinnamic acid and the like. The hydroxyalkyl group of the acrylate or methacrylate half esters preferably contains from two to six carbon atoms and includes such groups as hydroxyethyl, beta-hydroxypropyl, beta-hydroxybutyl and the like. It is also intended to include those hydroxyalkyl groups in which an ether oxygen is present. The dicarboxylic acids can be either saturated or unsaturated. Saturated acids include phthalic acid, chlorendic acid, tetrabromophthalic acid, adipic acid, succinic acid, glutaric acid and the like. Unsaturated dicarboxylic acids include maleic acid, fumaric acid, citraconic acid, itaconic acid, halogenated maleic or fumaric acids, mesaconic acid and the like. Mixtures of ethylenically unsaturated carboxylic acids may be used.

Preferably, the half esters are prepared by reacting substantially equal molar proportions of a hydroxyalkyl acrylate or methacrylate with a dicarboxylic acid anhydride. Preferred unsaturated anhydrides include maleic anhydride, citraconic anhydride, itaconic anhydride and the like and preferred saturated anhydrides include phthalic anhydride, tetrabromophthalic anhydride, chlorendic anhydride and the like. Advantageously, a polymerization inhibitor, such as the methyl ether of hydroquinone or hydroquinone, may be added since elevated temperatures are useful in preparing the half esters.

Any of the known polyepoxides can be employed in the preparation of the vinyl ester resins of this invention. Useful polyepoxides are glycidyl polyethers of both polyhydric alcohols and polyhydric phenols, epoxy novolacs, epoxidized fatty acids or drying oil acids, epoxidized diolefins, epoxidized di-unsaturated acid esters, epoxidized unsaturated polyesters and mixtures thereof so long as they contain more than one epoxide group per molecule. The polyepoxides may be monomeric or polymeric.

While the invention is applicable to polyepoxides generally, preferred polyepoxides are glycidyl polyethers of polyhydric alcohols or polyhydric phenols having weights per epoxide group of 150 to 2,000. These polyepoxides are usually made by reacting at least about two moles of an epihalohydrin or glycerol dihalohydrin with one mole of the polyhydric alcohol or polyhydric phenol and a sufficient amount of a caustic alkali to combine with the halogen of the halohydrin. The products are characterized by the presence of more than one epoxide group, i.e., a 1,2-epoxy equivalency greater than one.

Suitable dicarboxylic acid anhydrides for reaction with the secondary hydroxyl groups include both the saturated anhydrides, such as phthalic anhydride, tetrabromophthalic anhydride, chlorendic anhydride and the like, and the α,β-unsaturated dicarboxylic acid anhydrides, such as maleic anhydride, citraconic anhydride, itaconic anhydride and the like.

A wide selection of polymerizable monomers containing a >C=CH$_2$ group is available from the many known classes of vinyl monomers. Preferred polymerizable monomers are styrene, vinyl toluene, ortho-, meta- and para-halostyrenes, vinyl naphthalene, the various alpha-substituted styrenes, as well as the various di-, tri- and tetra-halo styrenes and acrylic, methacrylic and crotonic acid esters which include both the saturated alcohol esters and the hydroxyalkyl esters.

In the preparation of the vinyl ester resins, various inhibitors and catalysts may be used. Any of the well known vinyl polymerization inhibitors, such as hydroquinone or the methyl ether of hydroquinone and the like, may be used. Additionally, the reaction of the polyepoxide with the carboxylic acid may be conducted either in the presence or absence of a catalyst such as alcoholates, tertiary-amino phenols and the like.

It has now been discovered that a known fast cure initiator (2,5-dimethylhexane-2,5-diperoctoate, unexpectedly provides extended shelf life to the previously described B-staged chemically modified vinyl ester resin while maintaining its fast cure rate. This is particularly unexpected since said peroctoate catalyst is one of the most active initiators commercially available, for example the manufacturer recommends using it in only 25 to 50% of the amounts normally used for benzoyl peroxide. The proportions of said peroctoate in the B-staged resin may vary from about 0.1 to about 1 weight percent, based on resin solids and monomer, if present, and preferably ranges from about 0.2 to about 0.5 weight percent.

The unexpected activity of 2,5-dimethylhexane-2,5-diperoctoate is also found when used in combination with dicumyl peroxide, a known high temperature initiator. In combination with dicumyl peroxide, for example, said peroctoate catalyst comprises from about 0.01 to about 0.5 weight percent based on resin solids and monomer, if present and preferably from about 0.05 to about 0.15 weight percent. The dicumyl peroxide ranges from about 0.4 to 5 weight percent, same basis as above, and preferably from about 1 to 2 weight percent.

B-staged chemically modified vinyl ester resin compositions containing a catalyst according to this invention are preferably not exposed to high temperatures for any lengthy period of time in order to obtain the maximum storage life. Storage is preferably maintained at temperatures not to exceed about 45° C. Curing of said B-staged resins may be accomplished by heating to about 240 to 330° F., preferably from 270 to 300° F.

The following, non-limiting examples are presented to further illustrate the present invention. The following resins were prepared:

*Resin A.*—Is an unmodified vinyl ester resin (not B-stageable) prepared by first reacting equimolar quantities of 2-hydroxy-ethyl acrylate and maleic anhydride followed by reacting the maleate half-ester with a bisphenol A based polyepoxide resin having an epoxide equivalent weight of 172–178 (1 equivalent of epoxide/each equivilent of —COOH). This resin is prepared according to U.S. 3,367,992. The final resin is diluted with styrene until it contains about 40% by weight styrene.

*Resin B.*—Is a vinyl ester resin chemically modified to contain free carboxylic acid groups. The resin was prepared by first reacting 130 parts by wt. of 2-hydroxypropyl acrylate with 98 parts of maleic anhydride. The maleate half ester was then reacted with 190 parts of a polyepoxide resin based on bisphenol A having an epoxide equivalent weight of 186–192. The reaction was carried out in the presence of 0.253 part of hydroquinone and 0.38 part of DMP–30 catalyst. The vinyl ester resin was then reacted with 88.8 parts of phthalic anhydride, and diluted with 506.8 parts of styrene.

*Resin C.*—Is an unmodified vinyl ester resin prepared similarly to Resin A from 117 parts by wt. 2-hydroxyethyl acrylate, 98 parts maleic anhydride, 372 parts of a polyepoxide resin mixture of a glycidyl polyether of a polypropylene glycol and a glycidyl polyether based on bisphenol A, said mixture having an epoxide equivalent weight of 364 to 380, 0.558 part of DMP–30, 0.147 part of hydroquinone and 587 parts of styrene. DMP–30 is Tris(dimethylaminomethyl) phenol.

EXAMPLE 1

A B-staged resin composition was prepared by mixing 75 parts by weight of Resin B, 25 parts of Resin C and 0.25 part of a commercially available form of 2,5-dimethylhexane-2,5-diperoctoate (USP 245, minimum 90% purity). Then, 100 parts of an inert kaolin filler clay (McNamee clay) was blended in with 5 parts of zinc stearate and 0.5 part of a fatty alcohol phosphate composition (Zelec UN).

A magnesium oxide dispersion was prepared from 60 parts by wt. of Resin A, 40 parts of magnesium oxide and 1.2 parts of Zelec UN. The above components were ball milled until a free flowing, non-settling consistency was obtained.

B-staging was accomplished by mixing 20.7 parts of the magnesium oxide dispersion with the above clay filled resin composition. A firm solid resulted that was moldable and had the following properties:

Cure time:
  At 270° F.—45 to 60 seconds
  At 300° F.—to 3 to 45 seconds
Stability:
  At 75° F.—23 weeks (still in progress Jan. 29, 1968)
  At 90° F.—13–23 weeks
  At 115° F.—5–6 days Stability was determined by pouring and sealing samples of the molding composition in 2 oz. bottles before B-staging was complete. The bottles were then stored at constant temperatures. At various time intervals the samples were tested by pushing a sharply pointed instrument into the resin and when the resin was gelled sufficiently to prevent the instrument from penetrating to the bottom of the bottle the test was considered finished. The stability was recorded as the days or weeks before gelation occurred.

Cure time was determined in the following manner: About 10 gms. of the B-staged composition was placed between two sheets of Mylar polyester film and then placed in an open platen press at 270° F. or 300° F., as indicated. The composition was quickly pressed to 0.1 inch thickness between the platens and the time started. At the end of the desired time it was quickly removed and quenched in cold water. The extent of cure was then determined by breaking the composition. When it breaks with a snap it was rated as cured; when it was soft, and bent without resistance it was rated as uncured; and if it is tough and resistant to bending but bends, it was rated as partially cured. Samples were tested at 10 second curing intervals up to 30 seconds, 15 second intervals from 30 to 90 seconds, and 30 second intervals after 90 seconds. A cure time of 45 seconds indicates it was soft at 30 seconds and cured at 45 seconds. A cure time of 30–45 seconds means it was partially cured at 30 seconds and fully cured at 45 seconds.

EXAMPLES 2–8

Tests were made similar to that of Example 1 except that the catalyst was varied. The results and proportions of catalysts are shown in the following table. The results of Example 1 are also included. Example 8 is included to illustrate the stability when magnesium oxide was not included and the resin was not B-staged.

Comparison of Examples 1–3 with 4 illustrates the unexpected results obtained with this invention when the peroctoate (Examples 1–3) is compared to another fast initiator, benzoyl peroxide (Example 4). The results are self evident.

Example 6 illustrates the stability that can be obtained with a high temperature initiator such as dicumyl peroxide. Comparison of Example 6 with Example 7 shows the improved cure rate that is obtained when the peroctoate catalyst is combined with dicumyl peroxide while retaining excellent stability. It is to be noted that to the molder there is a significant difference between a cure time of 60 seconds and 90 seconds. Comparison of Example 3 with Example 8 illustrates that the resin must be B-staged in order to obtain the desired stable shelf life.

The present invention is of particular advantage in the molding of reinforced plastic articles and makes possible continuous automatic molding. The molder also has greater operational flexibility in that the B-staged chemically modified vinyl ester resins can be inventoried for use as production and sales needs dictates without any loss of fast curing properties.

The above description and the examples are set forth for purposes of illustration only. Variations and modifications thereof will be obvious to those skilled in the art and may be made without departing from the scope of the invention herein described.

What is claimed is:

1. In a process for B-staging at least 30 percent by weight of a vinyl ester resin prepared (a) by reacting an ethylenically unsaturated monocarboxylic acid with a polyepoxide, and then (b) reacting a dicarboxylic acid anhydride with the secondary hydroxyl groups formed from the epoxide-carboxylic acid reaction to provide pendant half ester groups; said reactants combined in the proportion of 0.8 to 1.2 equivalents of epoxide per equivalent of carboxylic acid and 0.1 to 1.2 moles of dicarboxylic acid anhydride per equivalent of epoxide and containing up to 70 percent by weight of a monomer polymerizable therewith which comprises combining said modified vinyl ester resin with controlled amounts of a Group II metal oxide or hydroxide and water, the improvement which comprises adding to said resin a catalyst wherein the catalyst is 2,5-dimethylhexane-2,5-diperoctoate present in the proportions of about 0.1 to about 1 percent by weight based on resin solids and monomer or a mixture of said peroctoate with dicumyl peroxide present in the proportions of about 0.01 to about 0.5 percent by weight based on resin solids and monomer of said peroctoate and from about 0.4 to about 5 percent by weight based on resin solids and monomer of dicumyl peroxide.

2. The process of claim 1 wherein said Group II oxide is magnesium oxide.

3. The process of claim 1 wherein said peroctoate catalyst is present in the proportion of 0.2 to 0.5 percent by weight.

4. The process of claim 1 wherein said catalyst mixture is present in the proportions of 0.05 to 0.15 percent by weight of said peroctoate and 1 to 2 percent by weight of dicumyl peroxide.

5. The process of claim 1 wherein said vinyl ester resin contains styrene.

TABLE I

| | Example | | | | | | | |
|---|---|---|---|---|---|---|---|---|
| | 1 | 2 | 3 | 4 | 5 | 6 | 7 | 8 [6] |
| Parts of USP 245 [1] | 0.25 | 0.5 | 0.1 | | | | 0.1 | 0.1 |
| Parts of BPO [2] | | | | 1 | | | | |
| Parts of TBP [3] | | | | | 2 | | | |
| Parts of DCP [4] | | | | | | 2 | 2 | |
| Cure time, seconds: | | | | | | | | |
| at 270° F | 45–60 | 45 | | 60 | 75 | 90 | 60 | |
| at 300° F | 30–45 | 30 | | 30–45 | 45 | 45 | 45 | |
| Stability: | | | | | | | | |
| at 75° F | 23 wks [5] | 23 wks [5] | 22 wks [5] | 5–7 days | 5 wks | 23 wks [5] | 21 wks [5] | 10–20 days |
| at 90° F | 13–23 wks | 4 wks | 22 wks [5] | 5 days | 2 wks | 23 wks [5] | 21 wks [5] | 10–20 days |
| at 115° F | 5–6 days | 3 days | 23 days | 1 day | 4 days | 14–22 wks | 13–17 days | 2 days |

[1] USP 245 is 2,5-dimethylhexane-2,5-diperoctoate.
[2] BPO is benzoyl peroxide.
[3] TBP is tertiary butyl peroxide.
[4] DCP is dicumyl peroxide.
[5] Test still in progress.
[6] Composition did not contain MgO and was not B-staged.

6. A fast curing B-staging vinyl ester resin composition having a stable shelf life which comprises at least 30 percent by weight of a vinyl ester resin prepared (a) by reacting an ethylenically unsaturated monocarboxylic acid with a polyepoxide, and then (b) reacting a dicarboxylic acid anhydride with the secondary hydroxyl groups formed from the epoxide-carboxylic acid reaction to provide pendant half ester groups; said reactants combined in the proportion of 0.8 to 1.2 equivalents of epoxide per equivalent of carboxylic acid and 0.1 to 1.2 moles of dicarboxylic acid anhydride per equivalent of epoxide and containing up to 70 percent by weight of a monomer polymerizable therewith, (c) at least 0.75 equivalent of a Group II metal oxide or hydroxide per equivalent of carboxylic acid, (d) a catalytic amount of water and (e) a catalyst wherein the catalyst is 2,5-dimethylhexane-2,5-diperoctoate present in the proportions of about 0.1 to about 1 percent by weight based on resin solids and monomer or a mixture of said peroctoate with dicumyl peroxide present in the proportions of about 0.01 to about 0.5 percent by weight based on resin solids and monomer of said peroctoate and from about 0.4 to about 5 percent by weight based on resin solids and monomer of dicumyl peroxide.

7. The composition of claim 6 wherein said Group II oxide is magnesium oxide.

8. The composition of claim 6 wherein said peroctoate catalyst is present in the proportion of 0.2 to 0.5 percent by weight.

9. The composition of claim 6 wherein said catalyst mixture is present in the proportions of 0.5 to 0.15 percent by weight of said peroctoate and 1 to 2 percent by weight of dicumyl peroxide.

10. The composition of claim 6 wherein said vinyl ester resin contains styrene.

References Cited
UNITED STATES PATENTS

| 3,264,274 | 8/1966 | Leveskis | 260—80 |
| 3,420,914 | 1/1969 | May | 260—836 |

PAUL LIEBERMAN, Primary Examiner

U.S. Cl. X.R.

260—2, 37, 41, 47, 78.4, 837; 161—184